ived Dec. 9, 1969

3,483,253
PRODUCTION OF AMINES FROM ALDEHYDES OR KETONES
Karl Adam and Erich Haarer, Ludwigshafen (Rhine), Germany, assignors to Badische Anilin- & Soda-Fabrik Aktiengesellschaft, Ludwigshafen (Rhine), Germany
No Drawing. Filed Feb. 7, 1966, Ser. No. 525,347
Claims priority, application Germany, Feb. 17, 1965, B 80,571
Int. Cl. C07c *85/08*
U.S. Cl. 260—563          13 Claims

ABSTRACT OF THE DISCLOSURE

Production of amines by reacting an aldehyde or ketone with liquid ammonia and hydrogen at a temperature from 90 to 130° C. under a pressure of from 60 to 700 atmospheres gauge in the presence of a catalyst which contains (a) nickel and/or cobalt, (b) chromium and (c) at least one non-volatile mineral acid which is capable of being converted into an insoluble anhydride or an insoluble polyacid.

---

This invention relates to a new process for the production of amines from aldehydes or ketones, ammonia and hydrogen. More particularly, the invention relates to the use of catalysts for the said reaction.

It is known from German patent specification No. 848,653 that the reaction products of olefins, carbon monoxide and hydrogen, i.e. aldehydes or ketones, can be subjected to aminating hydrogenation using catalysts which contain nickel and/or cobalt in addition to chromium as an activator. For example 83% of butylamine and 5% of dibutylamine are obtained in the aminating hydrogenation of butyraldehyde using a catalyst of the said type. Since however there is more interest in monoalkylamines, it is desirable to direct the process of aminating hydrogenation toward achieving a higher yield of primary amines.

It is an object of the invention to provide a process for the production of amines from ketones or aldehydes by aminating hydrogenation in which a higher proportion of primary amines is obtained than in prior art methods. Another object of the invention is a process for the production of amines from ketones or aldehydes by aminating hydrogenation in which higher total yields of amines are obtained than by prior art methods. Yet another object of the invention is to provide a catalyst not hitherto used for aminating hydrogenation.

We have found that a higher total yield of amines and a higher proportion of primary amines are obtained from aldehydes or ketones, liquid ammonia and hydrogen in the presence of catalysts containing nickel and/or cobalt with chromium by using catalysts containing nickel and/or cobalt with chromium which have been activated by adding non-volatile mineral acids which are capable of being converted into insoluble anhydrides or polyacids, particularly phosphorus acids or boric acids.

When the catalysts according to this invention are used without carriers, they should contain at least 80% by weight, preferably more than 90% by weight, of nickel and/or cobalt. The content of chromium should be approximately 0.1 to 6.6% by weight and that of non-volatile mineral acid capable of being converted into an insoluble anhydride or polyacid should be 0.1 to 6.6% by weight. Manganese, cadmium, zinc and/or silver may be present in amounts of 0.1 to 6.6% by weight. When the catalysts are used as supported catalysts, the amount of nickel and/or cobalt deposited on the carrier should be at least 5% by weight. In general supported catalysts having 5 to 60%, preferably 10 to 25%, by weight (on the total supported catalyst) of nickel and/or cobalt, 0.1 to 5% by weight, particularly 0.5 to 1.5% by weight (on the total supported catalyst) of chromium and 0.1 to 5%, particularly 0.5 to 1.5%, by weight (on the total supported catalyst) of non-volatile mineral acid capable of conversion into an insoluble anhydride or polyacid are used. Examples of suitable non-volatile mineral acids which are capable of being converted into insoluble anhydrides or polyacids are sulfuric acid, vanadic acid, molybdic acid, tungstic acid, titanic acid and particularly phosphorus and boric acids.

Supported catalysts have proved to be particularly suitable. All materials capable of eliminating water are suitable as carriers, examples being silicic acid, fullers earth, bauxite, magnesium silicate and aluminum oxide, the use of aluminum oxide being preferred. The carrier may be previously shaped structures to which the metals are applied, or the metal components may be applied to powdered carrier material and the whole then shaped. The catalysts may also be used without carriers, as already stated, for example in the form of powders or press-molded into shaped articles. The catalysts may be prepared as oxides and these then reduced in the reaction chamber with hydrogen to nickel and/or cobalt, chromium, manganese, cadmium, zinc and/or silver. The metal oxides may be used and mixed as such, but usually they will be precipitated from their aqueous solutions in the form of hydroxides or carbonates which are then thermally converted into oxides by conventional methods.

When supported catalysts are used, the metals may for example be applied to the finished carrier, for example by impregnating the carrier with aqueous solutions containing the metal in ionic form, followed by drying and thermal decomposition. This method is suitable for example when using nitrates, acetates, oxalates, formates or ammoniates. The metal component may however be applied by precipitation onto the carrier as oxides, hydroxides or carbonates. Finally the metals may be applied to the carrier in the form of salts or hydroxides during the production of the carrier, for example by precipitating the carrier and the metal salt together as hydroxides or carbonates.

The addition of the non-volatile mineral acids capable of forming acid anhydrides or polyacids may be effected for example by subsequent impregnation of the unreduced catalyst, but better still by addition to the solution of the metal salt which is used to impregnate the carrier, prior to application to the carrier or prior to the precipitation of the metallic components of the catalyst.

The ratio of nickel and/or cobalt to the carrier may vary within wide limits; unsupported catalysts are suitable, as already stated, while on the other hand the lower limit of the nickel and/or cobalt content on the carrier should be at least 5% by weight. Supported catalysts having a content of 10 to 25% by weight of nickel and/or cobalt have proved to be particularly suitable.

The catalysts are used in the usual forms, for example pellets or chips. The catalysts used according to this invention may be used for aminating hydrogenation of aldehydes and ketones under conventional conditions.

The following are examples of carbonyl compounds that may be used: alkanals, particularly those having two to fourteen carbon atoms, for example acetaldehyde, propionaldehyde, butyraldehyde, so-called oxo-aldehydes, such as heptanal, octanal, or lauric aldehyde, dialkyl ketones, particularly those having one to four carbon atoms in the alkyl group, for example acetone, methyl ethyl ketone, diethyl ketone, dibutyl ketone, cycloalkanones, particularly those having five to twelve carbon atoms, as for example cyclohexanone, cyclooctanone, cyclododecanone, alkylaryl ketones, for example acetophenone or diaryl ketones, for example diphenyl ketone. Aldehydes and ketones which contain other functional groups as well as the carbonyl group which do not react under the reaction conditions, for example hydroxyl groups or carboxylic groups, may also be used. Thus for example hydroxyacetone, glycol aldehyde or pyruvic acid may be used. The carbonyl compounds, if they are liquid under the reaction conditions or will dissolve in liquid ammonia, may be reacted undiluted, but solvents or diluents may be used. Examples of these are the prepared amines themselves, or a mixture of these amines with ammonia such as is obtained in the aminating hydrogenation, or ammonia in liquid form. Hydrogen may be used in pure form or diluted by inert gases.

The molar ratio of carbonyl compound to ammonia advantageously lies at from 1:1.5 to 1:10, more advantageously from 1:1.5 to 1:3. Hydrogen is forced in at such pressure and continually supplemented so that the sum of the ammonia pressure and the hydrogen pressure is greater than the vapor pressure of the ammonia at the temperature used.

The reaction temperature is usually at 90° to 130° C. It is an advantage of the catalysts that very good yields are achieved even at temperatures below 120° C. and it may be preferred even to carry out the aminating hydrogenation at temperatures below 120° C.

Production of the amines is carried out at superatmospheric pressure, advantageously at 60 to 700 atmospheres gauge and preferably at 250 to 350 atmospheres gauge.

Aminating hydrogenation of the carbonyl compounds may be carried out batchwise or continuously. In the batchwise method, about 1 to 10% by weight of catalyst (calculated as reduced catalyst) is used with reference to carbonyl compound. In continuous operation, the process may be carried out by introducing the gaseous reactant into the liquid phase from the bottom and withdrawing the product at the top, or by trickling the liquid phase down a packed column countercurrent to ascending gaseous reactant. Using the latter method, throughputs of 5 kg./liter of catalyst per day can be achieved.

The invention is illustrated by the following examples.

Example 1

An aqueous solution of 1677 g. of cobalt nitrate, $Co(NO_3)_2 \cdot 6H_2O$, 34.6 g. of chromic acid and 10 g. of phosphoric acid in 1500 ml. of water is applied to an aluminum oxide carrier which is then dried and the nitrate is converted into the oxide by heating at 300° C. After the active components have been applied, the catalyst contains 17% of cobalt, 0.9% of chromium and 0.5% of phosphoric acid.

The catalyst is charged into a vertical high pressure tube having a diameter of 30 mm. and a capacity of 2.5 liters and reduced with hydrogen. Then 216 g. of butyraldehyde and 150 g. of ammonia are passed per hour at 110° C. and 300 atmospheres gauge hydrogen pressure over the catalyst. 150 g. per hour of the reaction mixture obtained is passed again over the catalyst together with fresh mixture of butyraldehyde and ammonia. After steady-state conditions have been set up, the reaction mixture, after the ammonia, hydrogen and water have been separated contains 96.0% of primary butylamine, 0.5% of secondary butylamine and 3.5% of residue (as determined by gas chromatographic analysis). 210 g. of butylamine, 1.1 g. of secondary butylamine and 7.6 g. of residue are obtained from 216 g. of butyraldehyde.

Example 2

Isobutyraldehyde is reacted at 120° C. as described in Example 1. 216 g. of isobutyraldehyde, 250 g. of liquid ammonia and 150 g. of recycled reaction mixture are passed over the catalyst per hour. Gas chromatographic analysis shows that, after steady-state conditions have been set up and after the ammonia, hydrogen and water have been separated, the product contains 92% of isobutylamine and 7.8% of residue. 216 g. of isobutyraldehyde yields 202 g. of isobutylamine and 17.2 g. of residue.

Example 3

A catalyst is prepared by applying 1776 g. of cobalt nitrate $Co(CO_3)_2 \cdot 6H_2O$, 38.5 g. of chromic acid and 30 g. of phosphoric acid to aluminum oxide so that it contains 18% of cobalt, 1% of chromium and 1.5% of phosphoric acid. This catalyst is used for hydrogenating amination of methyl ethyl ketone in the apparatus described in Example 1. 216 g. of methyl ethyl ketone, 150 g. of liquid ammonia and 150 g. of recycled reaction mixture are passed over the catalyst per hour and hydrogenated at a temperature of 110° C. and a pressure of 300 atmospheres gauge. After the reaction product has been freed from ammonia, water and hydrogen, it contains (according to gas chromatographic analysis) 95.5% of secondary butylamine and 4.5% of residue. 216 g. of methyl ethyl ketone gives 209.5 g. of secondary butylamine and 9.8 g. of residue.

Example 4

Acetophenone is subjected to hydrogenating amination in a similar manner to that described in Example 1 using the same catalyst and the same apparatus. 240 g. of acetophenone and 250 g. of liquid ammonia are passed over the catalyst at a temperature of 120° C. and a pressure of 300 atmospheres gauge without recycling any end product. Gas chromatographic analysis indicates 96.4% of secondary phenyl ethylamine and 3.6% of residue in the reaction product. 240 g. of acetophenone gives 233 g. of phenyl ethylamine and 8.7 g. of residue.

Example 5

A catalyst containing 17% of nickel, 1% of chromium and 1% of phosphoric acid is prepared by impregnating aluminum oxide with 1677 g. of nickel nitrate $Ni(NO_3)_2 \cdot 6H_2O$, 38.5 g. of chromic acid and 20 g. of phosphoric acid, thermally converting the nitrate into the oxide and reducing with hydrogen. The catalyst is used for hydrogenating amination of cyclooctanone in the apparatus described in Example 1. 252 g. of cyclooctanone, 250 g. of liquid ammonia and 150 g. of recycled reaction mixture per hour are passed over the catalyst at 115° C. and a pressure of 300 atmospheres gauge of hydrogen. The reaction product contains 95.1% of cyclooctylamine (determined by gas chromatography) and 4.9% of residue after ammonia, hydrogen and water have been separated. 252 g. of cyclooctanone gives 242 g. of cyclooctylamine and 12.4 g. of residue.

By using the catalyst described in Example 1 under otherwise the same conditions and without recycling the reaction mixture, 97.4% of cyclooctylamine and 2.6% of residue are obtained. 252 g. of cyclooctylamine gives 247.3 g. of cyclooctylamine and 6.6 g. of residue.

Example 6

A mixture of carbonates and hydroxides is precipitated by means of a solution of sodium carbonate from an aqueous solution containing per liter 669 g. of cobalt nitrate, 9.3 g. of chromic acid, 4 g. of boric acid and 2190 g. of aluminum sulfate. The mixture of carbonate and hydroxide is washed with water until the filtrate is free from alkali. The carbonates and hydroxides are dried and then converted into oxides at 300° C. The oxides are made into a paste with water, made into pellets of 4 x 6 mm. and heated to 450° C. in a muffle furnace. The catalyst is reduced with hydrogen. It has a content of 17% of cobalt, 0.9% of chromium, 0.5% of boric acid and the remainder aluminum oxide.

The catalyst is used for hydrogenating amination of butyraldehyde under the conditions described in Example 1. A recation product is obtained which contains 94.6% of n-butylamine, 0.5% of secondary butylamine and 4.9% of residue. 216 g. of butyraldehyde gives 207.5 g. of n-butylamine, 1.1 g. of secondary butylamine and 10.7 g. of residue.

Example 7

200 g. of butyraldehyde, 250 g. of liquid ammonia, 20 g. of Raney cobalt to which 0.5% by weight of chromium has been added and 0.5% of phosphoric acid are hydrogenated in a 1-liter rotary autoclave at 115° C. at 300 atmospheres hydrogen pressure until no further hydrogen has been absorbed for three hours. The reaction mixture is cooled and released from pressure, the contents of the autoclave are freed from ammonia and the catalyst is filtered off. According to gas chromatographic analysis, the reaction product contains 89.0% of n-butylamine, 3.8% of dibutylamine and 6.5% of residue.

By using the same catalyst but omitting the addition of phosphoric acid, a reaction product is obtained which contains, according to gas chromatographic analysis, 83.2% of n-butylamine, 5.0% of dibutylamine and 8.3% of residue.

Example 8

1000 g. 2-ethyl-2-hexen-1-al, 1920 g. liquid ammonia and 1 cubic meter (S.T.P.) recycle hydrogen are passed per hour at a temperature of 118° C. and a pressure of 300 atmospheres gauge over four liters of a catalyst of the type described in Example 3, which has previously been reduced. 1033 g. of a nearly water-white reaction product is obtained per hour. This is worked up by distillation and gives 935 g. (90.6%) 2-ethylhexylamine, 8.2 g. (0.8%) 2-ethylhexanol, 20.6 g. (2.0%) di(2-ethylhexyl)amine and 68 g. (6.6%) highboiling amines per hour.

Example 9

1040 g. 2-ethylhexanol, 1920 g. liquid ammonia and 1 cubic meter (S.T.P.) hydrogen per hour are reacted under the conditions described in Example 8. The water-white reaction product (1031 g. per hour) is worked up by distillation and gives per hour, 984 g. (95.4%) 2-ethylhexylamine, 10.2 g. (1.0%) di(2-ethylhexyl)amine and 36.0 g. (3.5%) high-boiling amines.

Example 10

212 g. benzaldehyde, 480 g. liquid ammonia and 1 cubic meter (S.T.P.) hydrogen are passed per hour at a temperature of 140° C. and a pressure of 300 atmospheres gauge over a catalyst which contains 18% nickel, 1% chromium and 1.5% phosphoric acid and has been prepared by applying nickel nitrate, chromic acid and phosphoric acid to aluminum oxide. The almost colorless reaction mixture (214 g. per hour) is worked up by distillation and gives 197 g. (92.0%) benzylamine and 16.9 g. (7.9%) high-boiling amines per hour.

We claim:
1. A process for the production of amines which comprises reacting an aldehyde or a ketone with liquid ammonia and hydrogen at a temperature of 90° to 130° C. and under a pressure of 60 to 700 atmospheres gauge in the presence of a catalyst which contains:
   (a) nickel and/or cobalt;
   (b) chromium and
   (c) at least one non-volatile mineral acid which is capable of being converted into an insoluble anhydride or an insoluble polyacid, said mineral acid being selected from the group consisting of sulfuric acid, vanadic acid, molybdic acid, tungstic acid, titanic acid, phosphoric acid and boric acid.

2. A process as claimed in claim 1 wherein the catalyst used contains not only components (a), (b) and (c) but also at least one of the metals manganese, cadmium, zinc or silver.

3. A process as claimed in claim 1 wherein the catalyst used is supported.

4. A process as claimed in claim 2 wherein the catalyst used is supported.

5. A process as claimed in claim 1 in which a catalyst is used which contains:
   (a) at least 80% by weight of nickel and/or cobalt;
   (b) 0.1 to 6.6% by weight of chromium and
   (c) 0.1 to 6.6% by weight of said non-volatile mineral acid.

6. A process as claimed in claim 1 in which phosphoric or boric acid is used as the non-volatile mineral acid.

7. A process as claimed in claim 2 in which phosphoric or boric acid is used as the non-volatile mineral acid.

8. A process as claimed in claim 3 in which phosphoric or boric acid is used as the non-volatile mineral acid.

9. A process as claimed in claim 4 in which phosphoric or boric acid is used as the non-volatile mineral acid.

10. A process as claimed in claim 5 in which phosphoric or boric acid is used as the non-volatile mineral acid.

11. A process as claimed in claim 1 in which an alkanal having two to fourteen carbon atoms is used as the aldehyde.

12. A process as claimed in claim 1 in which a dialkyl ketone having one to four carbon atoms in each alkyl radical, a cycloalkanone having five to twelve carbon atoms, an alkylaryl ketone or a diaryl ketone is used as the ketone.

13. A process as claimed in claim 1 in which the aldehyde or ketone and the ammonia are used in a molar ratio of 1:1.5 to 1:10.

References Cited

FOREIGN PATENTS 848,653   9/1952   Germany.

CHARLES B. PARKER, Primary Examiner
R. L. RAYMOND, Assistant Examiner

U.S. Cl. X.R.
252—432, 435, 436, 470; 260—570.8, 570.9, 584, 585